Oct. 22, 1929.  L. OLDFIELD  1,732,586
STEERING MECHANISM
Filed May 23, 1925    3 Sheets-Sheet 1
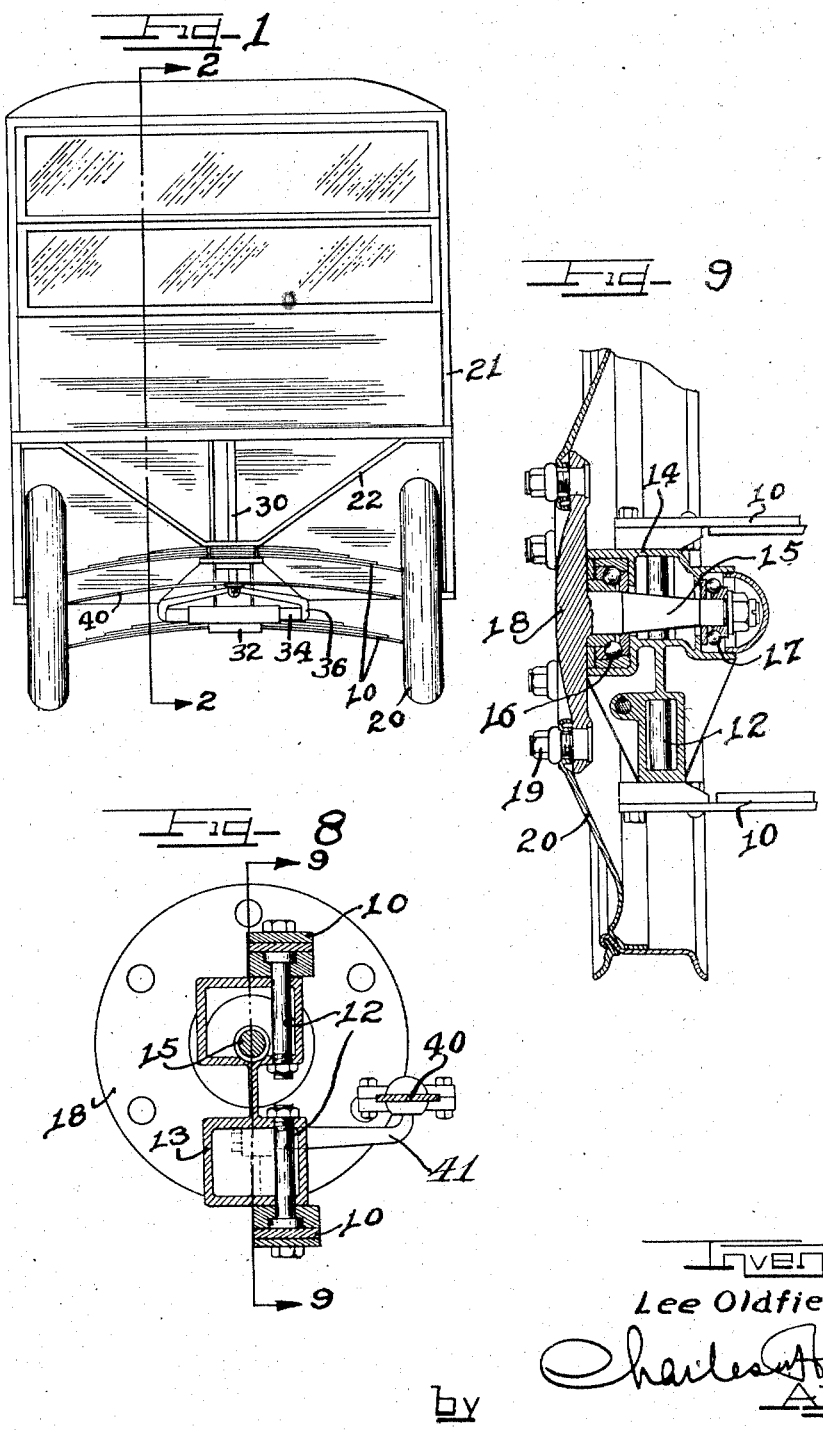
Inventor
Lee Oldfield

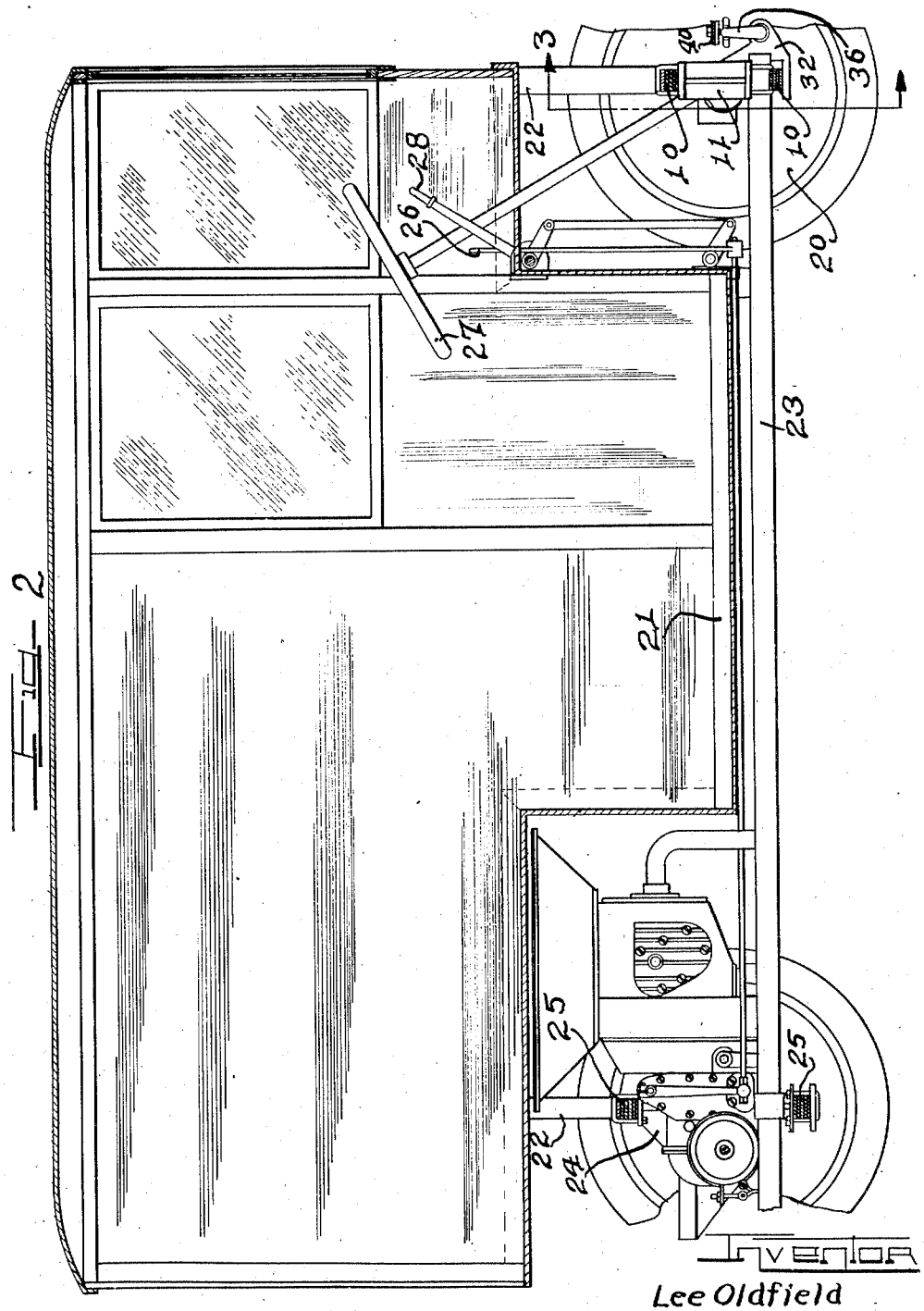

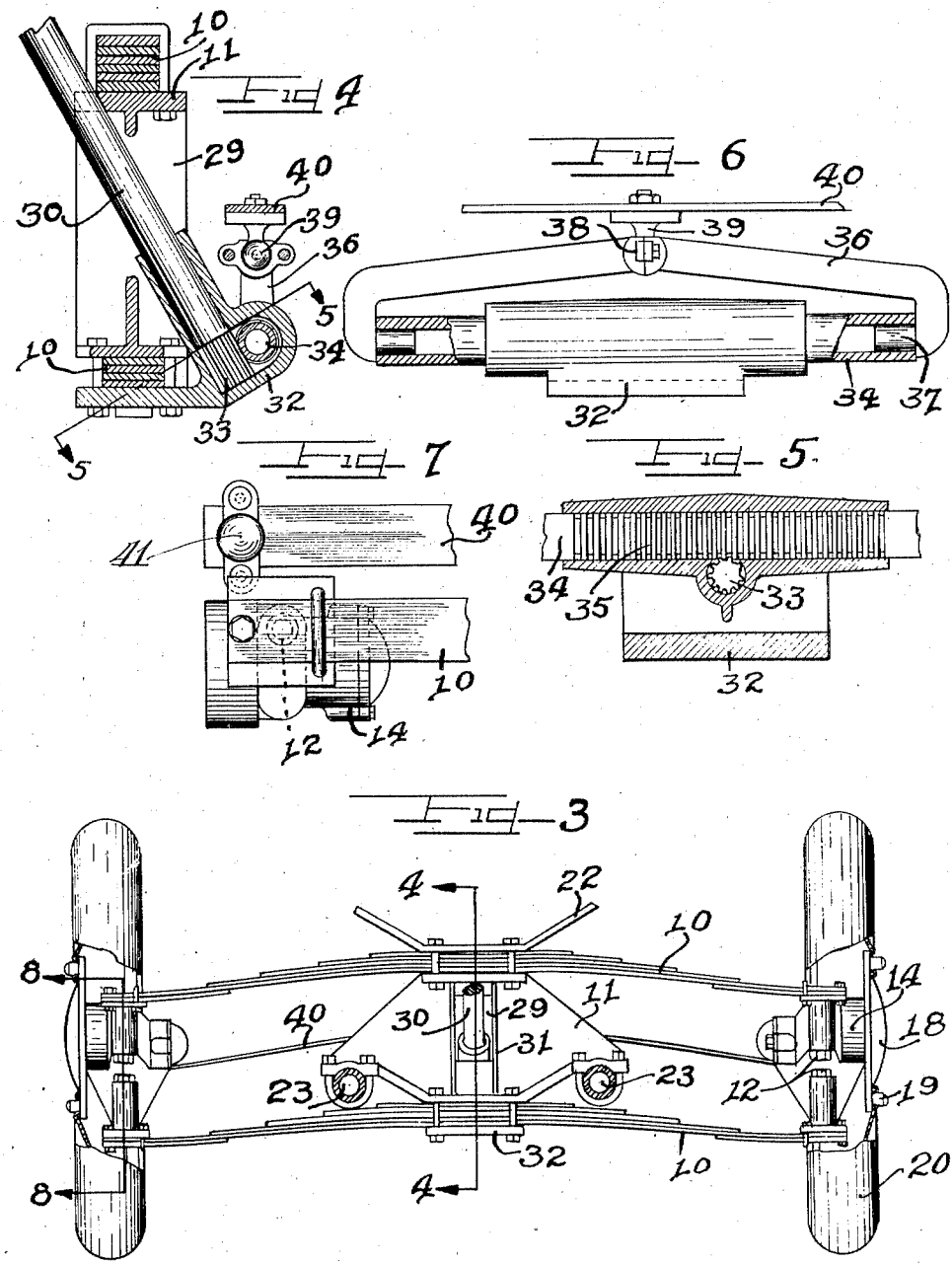

Patented Oct. 22, 1929

1,732,586

UNITED STATES PATENT OFFICE

LEE OLDFIELD, OF CHICAGO, ILLINOIS

STEERING MECHANISM

Application filed May 23, 1925. Serial No. 32,269.

This invention relates to steering mechanism for automotive vehicles.

It is an object of this invention to provide an improved steering mechanism wherein the apparatus is greatly simplified, rendered more durable, and less likely to bind or develop increased friction in service.

Heretofore steering mechanisms have involved either a cam and lever or gear connection to a steering arm, a connecting rod leading to the steering knuckle of one wheel, and a tie rod connecting the knuckles of the two wheels. In such a system the second wheel must derive its motion from the first wheel and consequently every element entering into the connection is a possible source of trouble in addition to the added bearings requiring lubrication. It is therefore an object of this invention to directly connect the steering mechanism to a member forming a tie rod between the wheels whereby both wheels are directly operated by the mechanism with the elimination of the usual gear arm, connecting rod, and the extra knuckle arm required thereby.

It is a further object of this invention to provide an improved steering mechanism having resilient connections permitting maximum movements of either wheel without affecting the other or binding the moving parts connecting the wheels.

It is also an object of this invention to provide a steering mechanism suitable for use with a resilient front axle system wherein no attempt is made to maintain a predetermined alignment between the wheel spindles.

Other and further important objects of this invention will be apparent from the disclosures in the specification and the accompanying drawings.

This invention (in a preferred form) is illustrated in the drawings and hereinafter more fully described.

On the drawings:

Figure 1 is a front view of a vehicle with which a preferred form of the device of this invention has been incorporated.

Figure 2 is a longitudinal section of the vehicle on the line 2—2 of Figure 1.

Figure 3 is a rear view of the front axle system with parts of the wheels broken away, taken on the line 3—3 of Figure 2.

Figure 4 is a section on the line 4—4 of Figure 3.

Figure 5 is a section on the line 5—5 of Figure 4.

Figure 6 is a front view of the steering gear linkage with parts broken away.

Figure 7 is a top view of a steering knuckle and wheel hub with the wheel omitted.

Figure 8 is an end section on the line 8—8 of Figure 3 with the wheel omitted.

Figure 9 is a section on the line 9—9 of Figure 8 with the wheel in place.

As shown on the drawings:

The device of this invention is illustrated as applied to a commercial type of automotive vehicle wherein special forms of axles are used. The axles comprise parallel transverse springs 10 clamped to a spacing bracket 11, in the case of the front axle, and secured to pivot pins 12 at the extremities of the springs, the pins 12 being journalled in a member 13 forming the front wheel steering knuckle. The spring ends are firmly clamped to the pins 12 instead of being shackled thereto so that the springs are subject to compound flexure, materially reducing the necessary number, weight, and stiffness of the individual spring leaves.

The steering knuckle member 13 also forms a stationary hub 14 within which the wheel spindle 15 revolves, the spindle being carried by a main ball or roller bearing 16 and a thrust bearing 17. A disc 18 formed on the spindle is provided with mounting studs 19 to receive a steel disc wheel 20, the reversed spindle and hub structure assuring practically center-point steering with a vertical pivot without the excessive bearing dimensions heretofore required to envelop the pivot pins with unyielding axles. A castoring effect is provided by the offsetting of the pivot pins relative to the wheel spindles. The axle assembly may also be tilted, as is conventional practice, to cause the wheels to tend to return to the straight ahead position.

The vehicle body 21 is supported directly over the front axle by means of the bracket 22, the central spacing bracket 11 being tied to the rear axle, by means of the longitudinal members 23 forming the chassis frame. The rear axle is constructed in a manner similar to the front axle, the power plant transmission housing 24 serving as a spacer for the springs 25. Gear shifting, in the particular arrangement chosen for illustration, is accomplished by means of the lever 26 shown below the steering wheel 27, and the clutch and brake controls are actuated by the lever 28.

The front spring spacing bracket 11 is centrally apertured at 29 for the steering post 30, reinforcing webs 31 being provided on either side of the aperture. A bottom bearing or gear case 32 supports the steering post and mechanism and is bolted to the bottom of the spacing bracket, serving also to clamp the lower spring 10 thereto. The end of the steering post 30 is provided with a pinion 33 meshing with a tube 34 having rack teeth 35 cut therein. These teeth may conveniently be formed as a single thread, in which case the pinion teeth would have a corresponding helix angle. Because of the general limberness of the axle structure, if a plain rack is used, the teeth are preferably cut full depth for a small angle either side of the normal position to prevent binding of the rack and pinion due to displacement of the connecting parts during steering movements and spring flexure. A split fork member 36 has pins 37 entering each end of the tube, and the branches of the fork are clamped together to form a ball socket 38 engaging a ball stud 39 secured to the flexible steering tie-rod 40 which in turn actuates the wheel hubs or steering knuckles through similar ball ended arms 41. The tie-rod is preferably of springlike construction because of the independent freedom of movement of the front wheels necessitating a vertically flexible steering system.

I am aware that many changes may be made and numerous details of construction may be varied through a wide range without departing from the principles of this invention and I therefore do not purpose limiting the patent granted hereon, otherwise than necessitated by the prior art.

I claim as my invention:

1. In combination with the steering wheels of a vehicle, a steering system comprising a steering column, a pinion associated therewith, a rack meshing with the pinion, a transversely resilient tie-rod connecting the steering wheels, a forked member pivotally connected to the ends of the rack, and a ball joint connecting the forked member to the center of said tie-rod.

2. In combination with a resilient axle comprising parallel springs, steering knuckles pivoted to the ends of said springs, wheel hubs associated with said steering knuckles, a transversely resilient tie-rod connecting the knuckles, a rack and pinion steering gear mechanism, and a forked connection from the ends of said rack to the center of said tie-rod, the forked member being pivotally connected to the ends of the rack.

3. In combination with the steering wheels of a vehicle, a steering system comprising a steering column, a pinion associated therewith, a rack meshing with the pinion, a traversely resilient tie-rod connecting the steering wheels, a forked member pivotally secured to the ends of the rack, and means connecting said forked member and said tie-rod.

4. In combination with wheels having spindles and housings for the spindles, pins journaled in the housings, and an axle comprising spaced parallel springs, the ends of which are rigidly clamped to the pins.

5. In a vehicle having steering wheels, a front axle system comprising parallel springs, a central spacer therefor, pins to which the ends of the springs are rigidly clamped, wheel spindle housings receiving the pins and pivoted thereon, wheel spindles associated with wheels and journaled in the housings, and steering means adapted to pivot said housings.

In testimony whereof I have hereunto subscribed my name.

LEE OLDFIELD.